(12) United States Patent
Kasichainula

(10) Patent No.: US 11,856,546 B2
(45) Date of Patent: Dec. 26, 2023

(54) TECHNOLOGIES FOR MANAGING INTERNAL TIME SYNCHRONIZATION

(71) Applicant: Intel Corporation, Santa Clara, CA (US)

(72) Inventor: Kishore Kasichainula, Phoenix, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/151,951

(22) Filed: Jan. 9, 2023

(65) Prior Publication Data

US 2023/0284168 A1 Sep. 7, 2023

Related U.S. Application Data

(63) Continuation of application No. 17/346,024, filed on Jun. 11, 2021, now Pat. No. 11,553,446, which is a continuation of application No. 16/145,320, filed on Sep. 28, 2018, now Pat. No. 11,057,857.

(51) Int. Cl.
*H04W 56/00* (2009.01)
*G05B 19/042* (2006.01)

(52) U.S. Cl.
CPC .... *H04W 56/0065* (2013.01); *G05B 19/0423* (2013.01); *H04W 56/003* (2013.01); *H04W 56/0015* (2013.01)

(58) Field of Classification Search
None
See application file for complete search history.

(56) References Cited

U.S. PATENT DOCUMENTS

| | | | |
|---|---|---|---|
| 11,057,857 B2 | 7/2021 | Kasichainula | |
| 2012/0300859 A1 | 11/2012 | Chapman | |
| 2014/0029604 A1 | 1/2014 | Nicholls et al. | |
| 2015/0103818 A1 | 4/2015 | Kuhn et al. | |
| 2015/0189692 A1 | 7/2015 | Portolan et al. | |
| 2016/0366660 A1 | 12/2016 | Segev et al. | |
| 2017/0288801 A1 | 10/2017 | Aweya | |
| 2018/0006798 A1* | 1/2018 | Bilstad | H04W 56/001 |

(Continued)

OTHER PUBLICATIONS

United States Patent and Trademark Office, "Non-Final Action" issued in U.S. Appl. No. 16/145,320 dated Mar. 27, 2020 (8 pages).

(Continued)

*Primary Examiner* — Walter J Divito
(74) *Attorney, Agent, or Firm* — Hanley, Flight & Zimmerman, LLC

(57) ABSTRACT

Technologies for managing internal time synchronization include an internet-of-things (IoT) device configured to determine a transport delay value as a function of a transmit path delay corresponding to a first message transmitted from an I/O device of the IoT device to a central timer of the IoT device and a receive path delay corresponding to a second message transmitted from the central timer to the I/O device. The IoT device is further configured to update, in response to having received a broadcast message from the central timer subsequent to having determined the transport delay value, a timestamp value of the received broadcast message as a function of the transport delay value. Other embodiments are described herein.

20 Claims, 8 Drawing Sheets

(56) References Cited

U.S. PATENT DOCUMENTS

| | | |
|---|---|---|
| 2018/0132199 A1 | 5/2018 | Zhang et al. |
| 2019/0074026 A1 | 3/2019 | Poulsen |
| 2019/0253167 A1 | 8/2019 | Wihamre |
| 2020/0084860 A1 | 3/2020 | Lydecker et al. |
| 2022/0141790 A1 | 5/2022 | Kasichainula |

OTHER PUBLICATIONS

United States Patent and Trademark Office, "Final Action" issued in U.S. Appl. No. 16/145,320 dated Sep. 18, 2020 (9 pages).
United States Patent and Trademark Office, "Notice of Allowance" issued in U.S. Appl. No. 16/145,320 dated Mar. 3, 2021 (5 pages).
United States Patent and Trademark Office, "Notice of Allowance" issued in connection with U.S. Appl. No. 17/346,024, dated Sep. 8, 2022, 8 Pages.

\* cited by examiner

# TECHNOLOGIES FOR MANAGING INTERNAL TIME SYNCHRONIZATION

CROSS-REFERENCE TO RELATED APPLICATIONS

The present application arises from a continuation of U.S. patent application Ser. No. 17/346,024, filed on Jun. 11, 2021, which is a continuation of U.S. patent application Ser. No. 16/145,320, which was filed on Sep. 28, 2018, both of which are incorporated here by reference in their entireties.

BACKGROUND

Many types of devices, such as sensors, vehicles, appliances, industrial equipment, and other things, are gaining computing resources and network capability. Sometimes described as the Internet of Things (IoT), modern computing systems may include cloud-based servers, network infrastructure, and connected edge devices that all work together to perform networked application functions. Oftentimes, modern computing systems perform operations that are time sensitive. In response, the Institute of Electrical and Electronics Engineers (IEEE) has developed various standards for deterministic networking, referred to collectively as Time Sensitive Networking (TSN), which are intended to provide extremely precise clock synchronization across the network. As a result, embedded designs in time sensitive applications (e.g., the industrial and automotive space) are increasingly integrating TSN controllers.

However, the capacity for applications to take advantage of the high precision clock synchronization afforded by TSN is generally limited by the precision, or more particularly the lack thereof, between the software clock (e.g. a processor Time Stamp Counter via read time-stamp counter instructions) and the network clock (e.g., IEEE 802.1AS-2011, IEEE 1588-2008, etc.). As such, the software is generally limited to repeatedly sampling its internal time and the network time on its network interface controller (NIC), and the precision of synchronization is typically limited to a minimum read latency achievable between the processor and the network time, which can have negative impacts on network performance.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
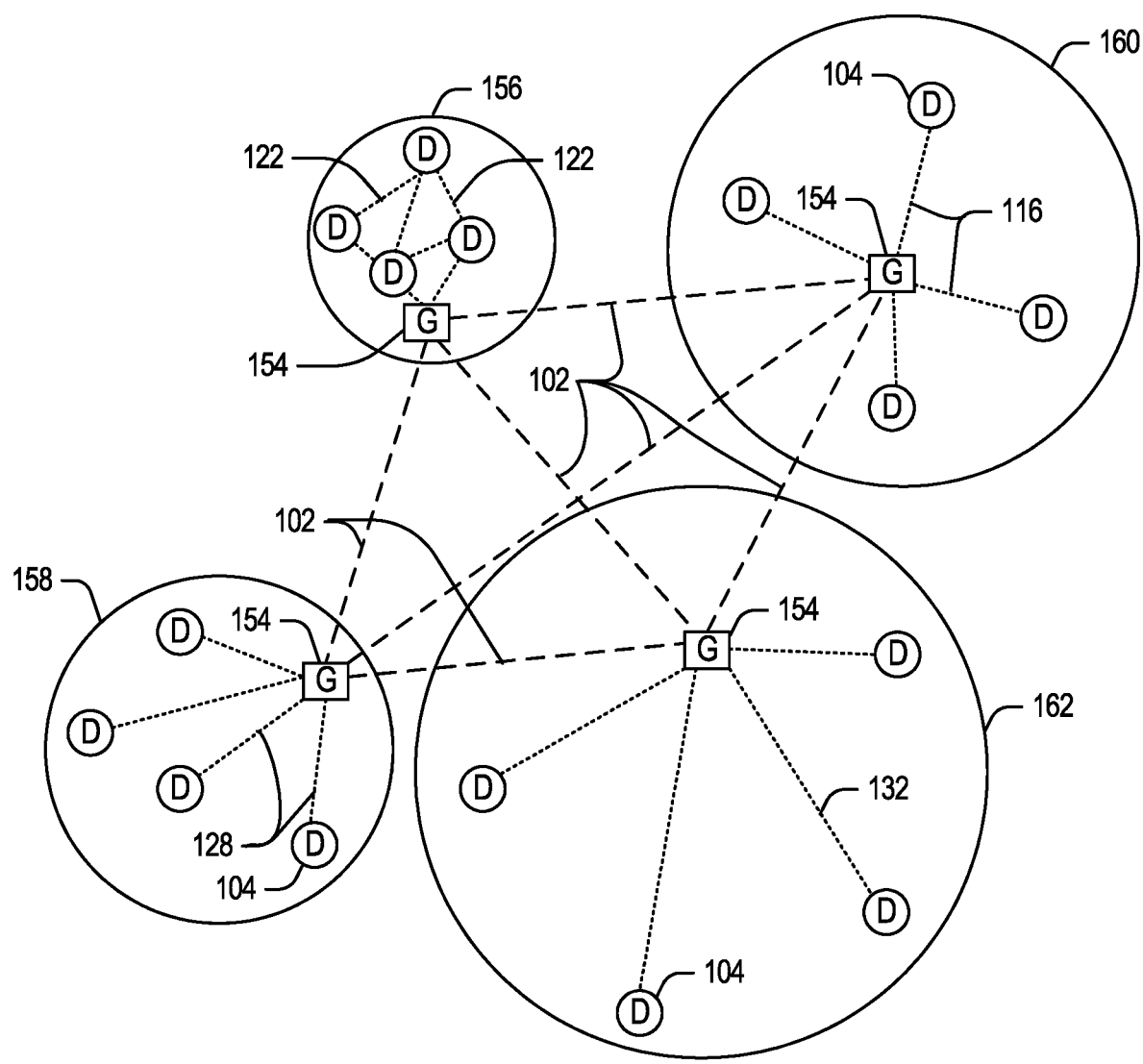
FIG. 1 is a simplified domain topology of at least one embodiment for respective internet-of-things (IoT) networks coupled through links to respective gateways.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

In use, the IoT device automatically determines and applies corrections for transport delays, without imposing restrictions on the layout, physical placement, and/or timing of any corresponding I/O device of the IoT device. To do so, the IoT device includes an additional serial signal wire between a central timer of the IoT device and one or more I/O devices (see, e.g., FIG. 8) to perform the transport delay determination and correction. As described previously, IoT devices are oftentimes deployed in time-sensitive environments, such as in industrial IoT deployments. To that end, the Institute of Electrical and Electronics Engineers (IEEE) has developed various standards for deterministic networking, referred to collectively as Time Sensitive Networking (TSN), which are intended to provide extremely precise clock synchronization across the network. As a result, embedded designs in time sensitive applications (e.g., the industrial and automotive space) are increasingly integrating TSN controllers.

However, the capacity for applications to take advantage of the high precision clock synchronization afforded by TSN is generally limited by the precision, or more particularly the lack thereof, between the software clock (e.g. a processor Time Stamp Counter via read time-stamp counter instructions) and the network clock (e.g., IEEE 802.1AS-2011, IEEE 1588-2008, etc.). As such, without hardware synchronization support, the software is generally limited to repeatedly sampling its internal time and the network time on its network interface controller (NIC) (see, e.g., the NIC 368 of FIG. 3), for example, and the precision of synchronization is typically limited to a minimum read latency achievable between the processor and the network time. It should be understood that one of the limiting factors of hardware synchronization is latency due to transport delay (e.g., the elapsed amount of time to transmit messages between components of the IoT device).

Depending on the embodiment, the transport delay may be in excess of a few hundred nanoseconds. In TSN applications, internal time synchronization between a local, central timer (ART) and an I/O system timer with low jitter is oftentimes considered to be operation critical. For example, the TSN software/driver schedules all the real time events based on these timers. As such, any jitter in the timing correlation between the timers will oftentimes lead to jitter in the scheduling of events. Accordingly, it should be appreciated that predictable and low jitter operations are generally considered crucial for certain applications, such as industrial control applications. Moreover TSN applications are increasingly deployed into automotive and other fields where tight control of events is considered a requirement.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
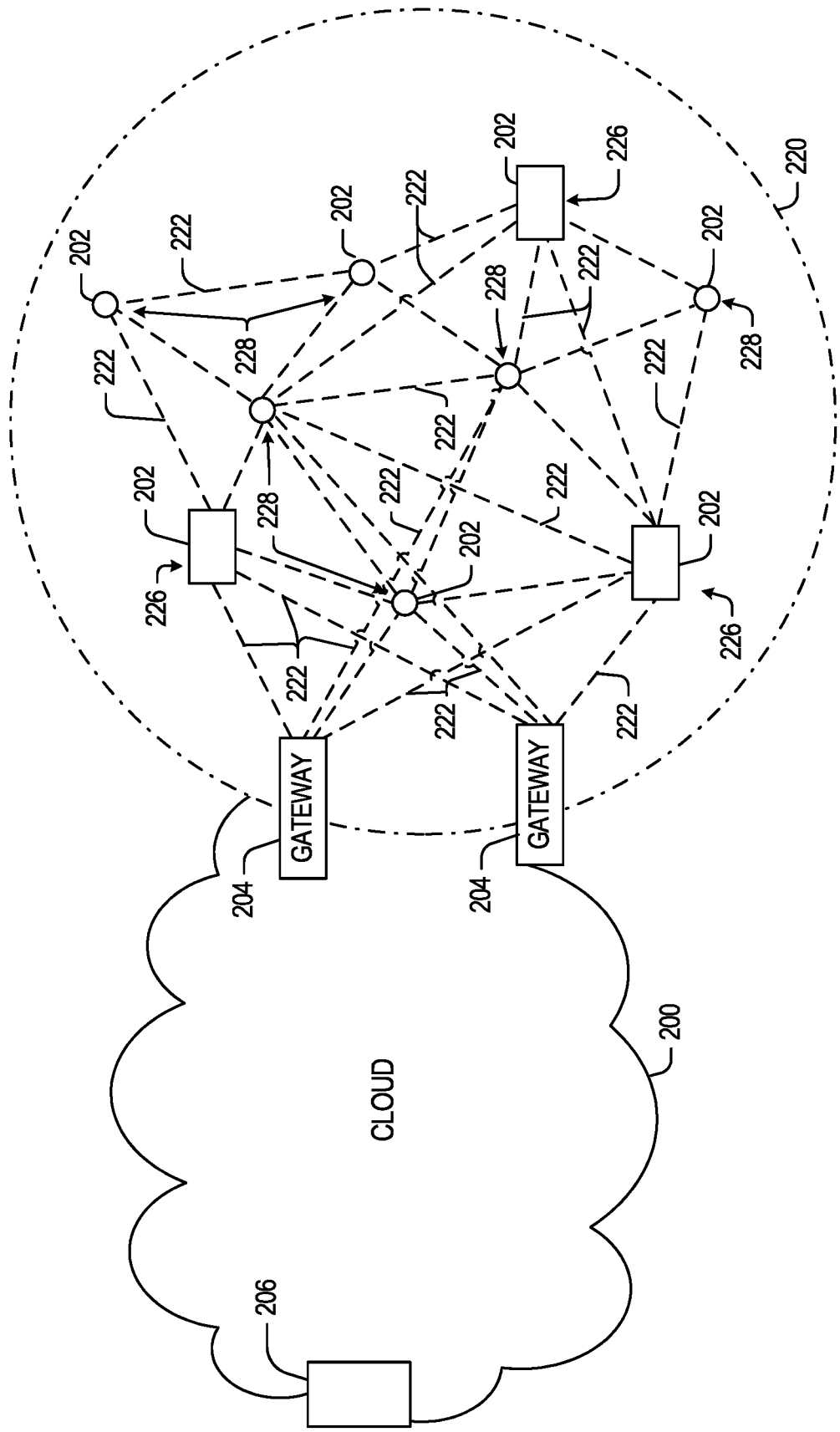
FIG. 2 is a simplified cloud computing network in communication with a mesh network of IoT devices operating as a fog device at the edge of the cloud computing network.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 3 and 12.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 3:
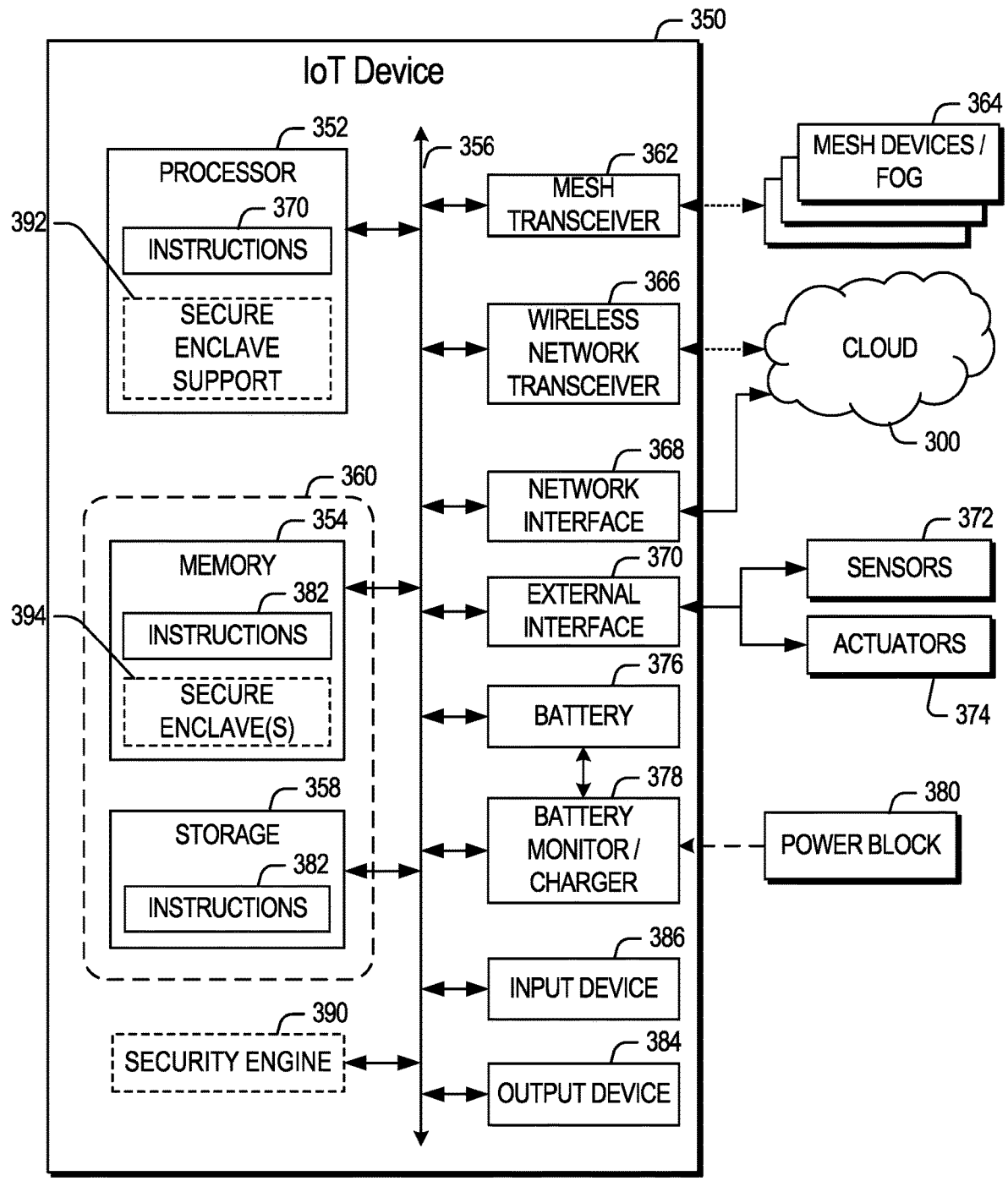
FIG. 3 is a simplified block diagram of at least one embodiment of an IoT processing system architecture upon which any one or more of the techniques (e.g., operations, processes, methods, and methodologies) discussed herein may be performed.

Referring now to FIG. 3, an illustrative block diagram is shown of components that may be present in an IoT device 350 for implementing the techniques described herein. The IoT device 350 may include any combinations of the components shown in the example or referenced in the disclosure above. The components may be implemented as ICs, portions thereof, discrete electronic devices, or other modules, logic, hardware, software, firmware, or a combination thereof adapted in the IoT device 350, or as components otherwise incorporated within a chassis of a larger system. Additionally, the block diagram of FIG. 3 is intended to depict a high-level view of components of the IoT device 350. However, some of the components shown may be omitted, additional components may be present, and different arrangement of the components shown may occur in other implementations.

The IoT device 350 may include a processor 352, which may be a microprocessor, a multi-core processor, a multi-threaded processor, an ultra-low voltage processor, an embedded processor, or other known processing element. The processor 352 may be a part of a system on a chip (SoC) in which the processor 352 and other components are formed into a single integrated circuit, or a single package, such as the Edison™ or Galileo™ SoC boards from Intel. As an example, the processor 352 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 352 may communicate with a system memory 354 over an interconnect 356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 358 may also couple to the processor 352 via the interconnect 356. In an example the storage 358 may be implemented via a solid state disk drive (SSDD). Other devices that may be used for the storage 358 include flash memory cards, such as SD cards, microSD cards, xD picture cards, and the like, and USB flash drives. In low power implementations, the storage 358 may be on-die memory or registers associated with the processor 352. However, in some examples, the storage 358 may be implemented using a micro hard disk drive (HDD). Further, any number of new technologies may be used for the storage 358 in addition to, or instead of, the technologies described, such resistance change memories, phase change memories, holographic memories, or chemical memories, among others.

The components may communicate over the interconnect 356. The interconnect 356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 356 may be a proprietary bus, for example, used in a SoC based system. Other bus systems may be included, such as an I2C interface, an SPI interface, point to point interfaces, and a power bus, among others.

The interconnect 356 may couple the processor 352 to a mesh transceiver 362, for communications with other mesh devices 364. The mesh transceiver 362 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 364. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 362 may communicate using multiple standards or radios for communications at different range. For example, the IoT device 350 may communicate with close devices, e.g., within about 10 meters, using a local transceiver based on BLE, or another low power radio, to save power. More distant mesh devices 364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 366 may be included to communicate with devices or services in the cloud 300 via local or wide area network protocols. The wireless network transceiver 366 may be a LPWA transceiver that follows the IEEE 802.15.4, or IEEE 802.15.4g standards, among others. The IoT device 350 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 362 and wireless network transceiver 366, as described herein. For example, the radio transceivers 362 and 366 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 362 and 366 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

The NIC 368 may be embodied as any type of firmware, hardware, software, or any combination thereof that facilitates communication to the cloud 300 or to other devices, such as the mesh devices 364. For example, the NIC 368 may be embodied as one or more add-in-boards, daughter-cards, network interface cards, controller chips, chipsets, or other devices that may be used by the IoT device 350 to connect with another device. While not illustratively shown, it should be appreciated that the NIC 368 typically includes one or more physical ports (e.g., for facilitating the ingress and egress of network traffic) and one or more devices for performing/offloading certain network functionality and/or processing functions (e.g., a DMA engine).

In some embodiments, the NIC 368 may be embodied as part of a SoC that includes one or more processors, or included on a multichip package that also contains one or more processors. Additionally or alternatively, in some embodiments, the NIC 368 may include one or more processing cores (not shown) local to the NIC 368. In such embodiments, the processing core(s) may be capable of performing one or more of the functions described herein. In some embodiments, the NIC 368 may additionally include a local memory (not shown). In such embodiments, the local memory of the NIC 368 may be integrated into one or more components of the IoT device 350 at the board level, socket level, chip level, and/or other levels.

In some embodiments, the NIC 368 may facilitate a wired communication enabling connection, such as an Ethernet connection, while in other embodiments the wired communication may be based on other types of data transmission enabling networks, such as Controller Area Network (CAN), Local Interconnect Network (LIN), DeviceNet, ControlNet, Data Highway+, PROFIBUS, or PROFINET, among many others. In other embodiments, the IoT device 350 may include one or more additional NICs 368, which may be included to allow connection to additional and/or alternative network. In an illustrative example, the IoT device 350 may include one NIC 368 to provide communications to the cloud over Ethernet, and another NIC 368 to provide communications to other devices over another type of network.

The interconnect 356 may couple the processor 352 to an external interface 370 that is used to connect external devices or subsystems. The external devices may include sensors 372, such as accelerometers, level sensors, flow sensors, optical light sensors, camera sensors, temperature sensors, global positioning system (GPS) sensors, pressure sensors, barometric pressure sensors, and the like. The external interface 370 further may be used to connect the IoT device 350 to actuators 374, such as power switches, valve actuators, an audible sound generator, a visual warning device, and the like.

In some optional examples, various input/output (I/O) devices may be present within, or connected to, the IoT device 350. For example, a display or other output device 384 may be included to show information, such as sensor readings or actuator position. An input device 386, such as a touch screen or keypad may be included to accept input. An output device 384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 350.

A battery 376 may power the IoT device 350, although in examples in which the IoT device 350 is mounted in a fixed location, it may have a power supply coupled to an electrical grid. The battery 376 may be a lithium ion battery, or a metal-air battery, such as a zinc-air battery, an aluminum-air battery, a lithium-air battery, and the like.

A battery monitor/charger 378 may be included in the IoT device 350 to track the state of charge (SoCh) of the battery 376. The battery monitor/charger 378 may be used to monitor other parameters of the battery 376 to provide failure predictions, such as the state of health (SoH) and the state of function (SoF) of the battery 376. The battery monitor/charger 378 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 378 may communicate the information on the battery 376 to the processor 352 over the interconnect 356. The battery monitor/charger 378 may also include an analog-to-digital (ADC) convertor that allows the processor 352 to directly monitor the voltage of the battery 376 or the current flow from the battery 376. The battery parameters may be used to determine actions that the IoT device 350 may perform, such as transmission frequency, mesh network operation, sensing frequency, and the like.

A power block 380, or other power supply coupled to a grid, may be coupled with the battery monitor/charger 378 to charge the battery 376. In some examples, the power block 380 may be replaced with a wireless power receiver to obtain the power wirelessly, for example, through a loop antenna in the IoT device 350. A wireless battery charging circuit, such as an LTC4020 chip from Linear Technologies of Milpitas, California, among others, may be included in the battery monitor/charger 378. The specific charging circuits chosen depend on the size of the battery 376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 358 may include instructions 382 in the form of software, firmware, or hardware commands to implement the techniques described herein. Although such instructions 382 are shown as code blocks included in the memory 354 and the storage 358, it may be understood that any of the code blocks may be replaced with hardwired circuits, for example, built into an application specific integrated circuit (ASIC).

In an example, the instructions 382 provided via the memory 354, the storage 358, or the processor 352 may be embodied as a non-transitory, machine readable medium 360 including code to direct the processor 352 to perform electronic operations in the IoT device 350. The processor 352 may access the non-transitory, machine readable medium 360 over the interconnect 356. The illustrative processor 352 includes a secure enclave support 392. The secure enclave support 392 allows the processor 352 to establish a trusted execution environment (TEE) known as a secure enclave (see, e.g., the secure enclave 394), in which executing code may be measured, verified, and/or otherwise determined to be authentic. Additionally, code and data included in the secure enclave may be encrypted or otherwise protected from being accessed by code executing outside of the secure enclave 394. For example, code and data included in the secure enclave may be protected by hardware protection mechanisms of the processor 352 while being executed or while being stored in certain protected cache memory (not shown) of the processor 352. The code and data included in the secure enclave may be encrypted when stored in a shared cache or the system memory 354. The secure enclave support 392 may be embodied as a set of processor instruction extensions that allows the processor 352 to establish one or more secure enclaves in the system memory 354. For example, the secure enclave support 392 may be embodied as Intel® Software Guard Extensions (SGX) technology. In some embodiments, the system memory 354 may be used to store the contents of one or more secure enclaves. When stored by the system memory 354, the contents of the secure enclave may be encrypted to prevent unauthorized access.

The non-transitory, machine readable medium 360 may be embodied by devices described for the storage 358 of FIG. 3 or may include specific storage units such as optical disks, flash drives, or any number of other hardware devices. Additionally, the non-transitory, machine readable medium 360 may include instructions to direct the processor 352 to perform a specific sequence or flow of actions, for example, as described with respect to the flowchart(s) and block diagram(s) of operations and functionality depicted above. In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions.

A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

The illustrative IoT device 350 additionally includes a security engine 390, which may be embodied as any hardware component(s) or circuitry capable of providing security-related services to the IoT device 350. In particular, the security engine 390 may include a microprocessor, microcontroller, or other embedded controller capable of executing firmware and/or other code independently and securely from the processor 352. Thus, the security engine 390 may be used to establish a trusted execution environment separate from code executed by the processor 352. The security engine 390 may communicate with the processor 352 and/or other components of the IoT device 350 over a dedicated bus, such as a host embedded controller interface (HECI).

The security engine 390 may also provide remote configuration, control, or management of the IoT device 350. In the illustrative embodiment, the security engine 390 is embodied as a converged security and manageability engine (CSME) incorporated in a SoC of the IoT device 350. In some embodiments, the security engine 390 may be embodied as a manageability engine, an out-of-band processor, a Trusted Platform Module (TPM), or other security engine device or collection of devices. Further, in some embodiments, the security engine 390 is also capable of communicating using the interconnect 356 or a dedicated communication circuit independently of the state of the IoT device 350 (e.g., independently of the state of the processor 352), also known as "out-of-band" communication.

Figure 4:
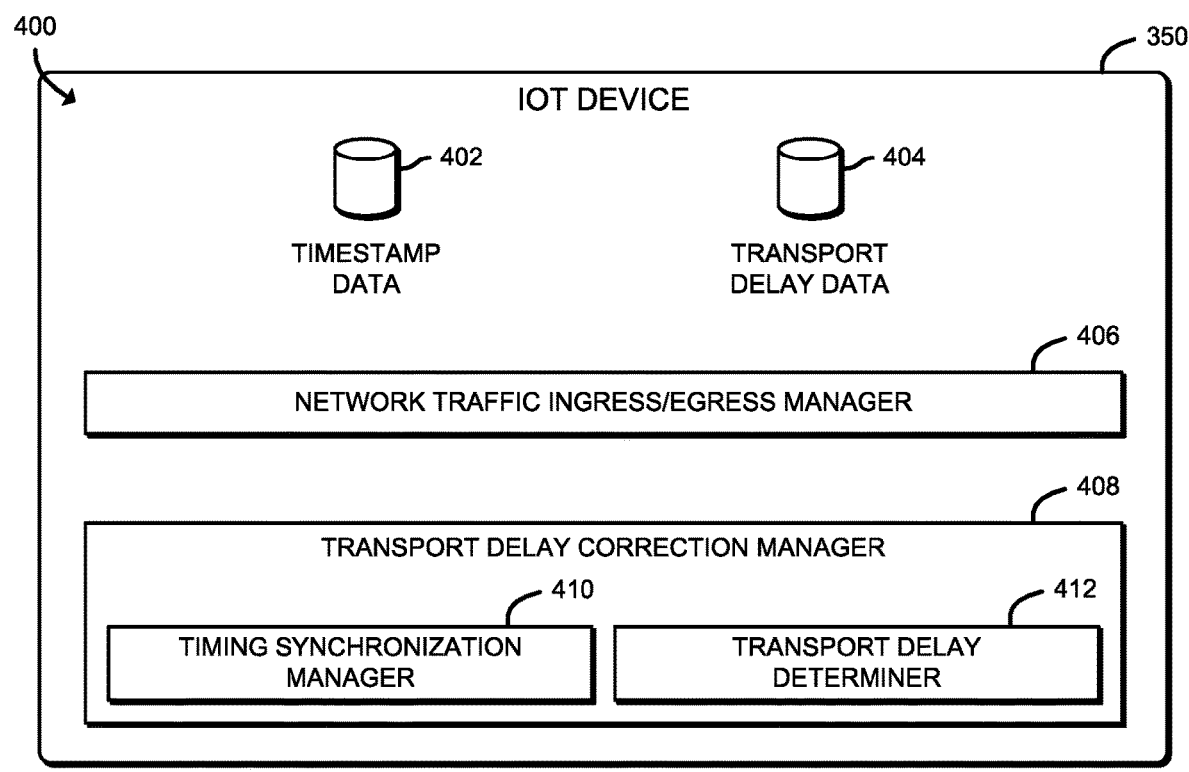
FIG. 4 is a simplified block diagram of at least one embodiment of an environment of an IoT device.

Referring now to FIG. 4, in use, the IoT device 350 establishes an illustrative environment 400 during operation to manage internal time synchronization. To do so, as will be described in further detail below, the IoT device 350 is configured to automatically determine and apply corrections for transport delays, without imposing restrictions on the layout, physical placement, and/or timing of any corresponding I/O device of the IoT device 350. Further, as will also be described in further detail below, the IoT device 350 includes an additional serial wire between a central timer of the IoT device 350 and the applicable I/O device to perform the transport delay determination and correction.

It should be understood that although there are several present time distribution/synchronization protocols (e.g., Network Time Protocol (NTP), IEEE 1588 Precision Time Protocol (PTP), etc.), such protocols are meant for time distribution between network systems and compute nodes. However, the "last inch" time synchronization (i.e., the synchronization between a NIC within a compute node to its processor/compute) presents an issue that can contribute significantly to time sync jitter. Accordingly, the compute node 102 is configured to employ the time sync mechanism described herein to solve the "last inch" time synchronization problem in such end-to-end systems and provide tight control on the end point clocks and compute clock. As such, the operations described here can be used as an extension to existing time distribution protocols, such as NTP and PTP. As described previously, the concepts described herein have particular relevance in time sensitive networks that are oftentimes used for industrial applications where tight controls on the end-to-end network have hard real-time requirements. Furthermore, it should be appreciated that the concepts described herein can also be used to synchronize systems and nodes over existing side band serial protocols like SPI and UART, where timestamp packets can be distributed over existing serial protocols.

The illustrative environment 400 includes a network traffic ingress/egress manager 406 and a transport delay correction manager 408. The various components of the environment 400 may be embodied as hardware, firmware, software, or a combination thereof. As such, in some embodiments, one or more of the components of the environment 400 may be embodied as circuitry or collection of electrical devices (e.g., network traffic ingress/egress management circuitry 406, transport delay correction management circuitry 408, etc.).

It should be appreciated that one or more functions described herein as being performed by the network traffic ingress/egress management circuitry 406 and/or the transport delay correction management circuitry 408 may be performed, at least in part, by one or more other components of the IoT device 350, such as the processor 352, the mesh transceiver 362, the network transceiver 366, the NIC 368, an ASIC, a programmable circuit such as an FPGA, and/or other components of the IoT device 350. It should be further appreciated that associated instructions may be stored in the memory 354, the storage 358, and/or other data storage location, which may be executed by the processor 352 and/or other computational processor of the IoT device 350.

Additionally, in some embodiments, one or more of the illustrative components may form a portion of another component and/or one or more of the illustrative components may be independent of one another. Further, in some embodiments, one or more of the components of the environment 400 may be embodied as virtualized hardware components or emulated architecture, which may be established and maintained by the processor 352, the mesh transceiver 362, the network transceiver 366, the NIC 368 and/or other software/hardware components of the IoT device 350. It should be appreciated that the IoT device 350 may include other components, sub-components, modules, sub-modules, logic, sub-logic, and/or devices commonly found in a computing device (e.g., device drivers, interfaces, etc.), which are not illustrated in FIG. 4 for clarity of the description.

In the illustrative environment 400, the IoT device 350 additionally includes timestamp data 402 and transport delay data 404, each of which may be accessed by the various components and/or sub-components of the IoT device 350. Further, each of the timestamp data 402 and the transport delay data 404 may be accessed by the various components of the IoT device 350. Additionally, it should be appreciated that in some embodiments the data stored in, or otherwise represented by, each of the telemetry data timestamp data 402 and the transport delay data 404 may not be mutually exclusive relative to each other. For example, in some implementations, data stored in the telemetry data timestamp data 402 may also be stored as a portion of one or more of the transport delay data 404, vice versa, or in another alternative arrangement. As such, although the various data utilized by the IoT device 350 is described herein as particular discrete data, such data may be combined, aggregated, and/or otherwise form portions of a single or multiple data sets, including duplicative copies, in other embodiments.

The network traffic ingress/egress manager 406, which may be embodied as hardware, firmware, software, virtualized hardware, emulated architecture, and/or a combination thereof as discussed above, is configured to receive inbound and route/transmit outbound network traffic. To do so, the network traffic ingress/egress manager 406 is configured to facilitate inbound/outbound network communications (e.g., network traffic, network packets, network flows, etc.) to and from the IoT device 350. For example, the network traffic ingress/egress manager 406 is configured to manage (e.g., create, modify, delete, etc.) connections to physical and virtual network ports (i.e., virtual network interfaces) of the IoT device 350, as well as the ingress/egress buffers/queues associated therewith.

The transport delay correction manager 408, which may be embodied as hardware, firmware, software, virtualized hardware, emulated architecture, and/or a combination thereof as discussed above, is configured to determine a transport delay and correct timestamps of received communications based thereon. To determine the transport delay and correct timestamps of received communications as a function of the determined transport delay, the illustrative transport delay correction manager 408 includes a timing synchronization manager 410 and a transport delay determiner 412.

The timing synchronization manager 410 is configured to determine the transport delay between a local, central timer and a system timer of an I/O component of the IoT device 350, such as the NIC 368. To do so, the timing synchronization manager 410 is configured to perform a time synchronization operation, which may be performed during a handshake between the central timer and the I/O device, for example. In an illustrative example, in which the central timer (e.g., an always running timer (ART) of a central timekeeping unit of the IoT device 350) transmitted a synchronization message to the I/O device, the timing synchronization manager 410 is configured to receive the synchronization message at an I/O device (e.g., the NIC 368) from the central timer. It should be appreciated that there is an appreciable amount of time that has elapsed between transmission of the synchronization message by the central timer and receipt of the synchronization message by the I/O device, referred to herein as a path delay.

In some embodiments, the messages between the central timer and the I/O device may have a length of either 17 bytes or 25 bytes, depending on the type of message, and be formatted to include a sync field, a type field, a device identifier (ID) field, a data-low field, and a data-high field. For example, the sync field may be 65 bits in length, the type field two bits in length, the device ID field five bits in length, and each of the data-low field and data-high field being 64 bits in length to include a timestamp in each field. The type field can be used to identify a type of the message, such as a normal broadcast message (e.g., which may be represented as '00'), a synchronization message (e.g., which may be represented as '01'), a synchronization response message (e.g., which may be represented as '10'), or a response acknowledgment message (e.g., which may be represented as '11'). It should be appreciated that typically only the central timer can initiate normal broadcast messages.

Upon receipt of the synchronization message by the I/O device (e.g., as determined by the type field providing such an indication), the timing synchronization manager 410 may be configured to store a time at which the synchronization message reached the I/O device. Further, the timing synchronization manager 410 is configured to decode and respond to the received synchronization message. To do so, the timing synchronization manager 410 is configured to generate a synchronization response message, in which data of the data-low field is replaced with a timestamp equivalent to time 't1', which represents a local, uncorrected time, and a device ID associated with the I/O device is placed in the device ID field of the synchronization response message. The timing synchronization manager 410 is additionally configured to store the value locally (e.g., in the timestamp data 402) for later use.

As will be described in further detail below (see, e.g., FIGS. 7 and 8), the synchronization response message is transmitted across a "slave" or secondary data signal wire (see, e.g., the sdata signal wire 712 of FIG. 7 and the sdata signal wires 806 of FIG. 8). The timing synchronization manager 410 is further configured to receive a response acknowledgment message from the central timer in which the data-low field includes a timestamp corresponding to the time at which the central timer received the synchronization response message from the I/O device, referred to herein as time 't2', and the data-low field includes another timestamp corresponding to the time at which the central timer transmitted the response acknowledgment message to the I/O device, referred to herein as time 't3', each of which are stored by the timing synchronization manager 410 (e.g., in the timestamp data 402). Upon receipt of the response acknowledgment message, the timing synchronization manager 410 is additionally configured to get and store (e.g., in the timestamp data 402) the time of receipt of the response acknowledgment message, referred to herein as time 't4', which again represents a local, uncorrected time. It should be appreciated that the timestamps described herein (e.g., as referred to herein as 't1', 't2', 't3', and 't4') should be captured at the ingress or egress ports of the respective component as close to the edge as possible.

The transport delay determiner 412 is configured to determine a value representative of the transport delay (i.e., a transport delay value), store the transport delay value (e.g., in the transport delay data 404), and use the determined transport delay value for timing correction. To do so, the transport delay determiner 412 is configured to determine a transmit path delay value as a difference between the time 't2' (i.e., the time at which the central timer received the synchronization response message from the I/O device) and the time 't1' (i.e., the time at which the synchronization message was transmitted by the I/O device). Additionally, the transport delay determiner 412 is configured to determine a response path delay value as a difference between the time 't4' (i.e., the time at which the response acknowledgment message was received at the I/O device) and the time 't3' (i.e., the time at which the central timer transmitted the response acknowledgment message to the I/O device). Further, the transport delay determiner 412 is configured to determine the transport delay value as an average of the transmit path delay value and the response path delay value. The transport delay determiner 412 is additionally configured to store the transport delay value (e.g., in the transport delay data 404), such that the transport delay value can be used in the time correction process by subtracting the transport delay value from timestamp values associated with communication messages subsequently broadcasted by the central timer and received by the I/O device.

Figure 5:
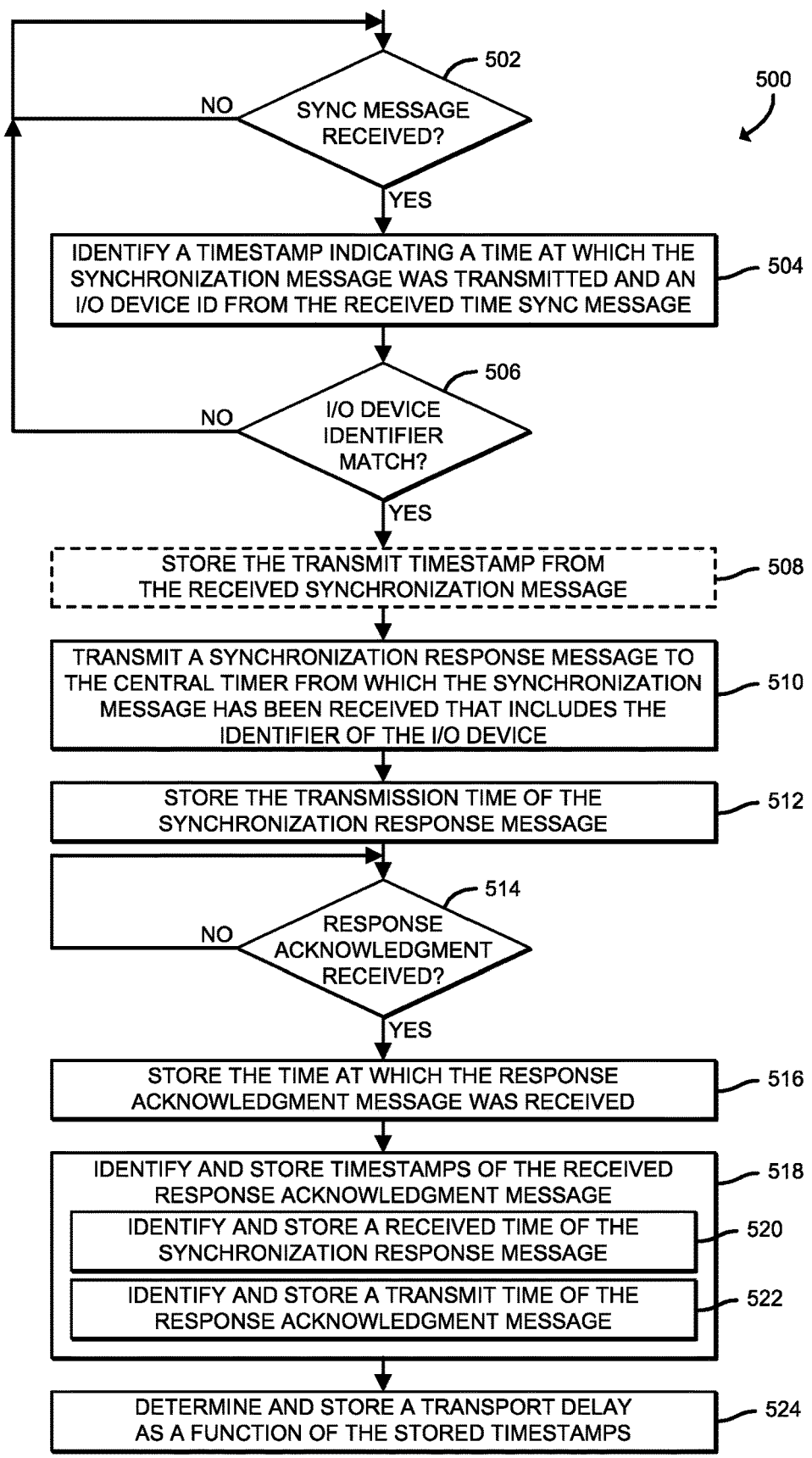
FIG. 5 is a simplified flow diagram of at least one embodiment of a method for determining the inputs to calculate a transport delay value usable to manage internal time synchronization that may be executed by the IoT device of FIG. 4.

Referring now to FIG. 5, a method 500 for determining the inputs to calculate a transport delay value usable to manage internal time synchronization is shown which may be executed by an IoT device (e.g., the IoT device 350). The method 500 begins in block 502, in which the IoT device 350, or more particularly an I/O device of the IoT device, determines whether a synchronization message has been received from a local, central timer of the IoT device 350. For example, the central timer may transmit the synchronization message upon having detected a particular event, such as during bootup of the IoT device 350 (e.g., in Basic Input/Output System (BIOS)), upon detecting the loss of content, and/or some other triggering event. If the synchronization message has been received by the I/O device, the method 500 advances to block 504, in which the I/O device identifies a timestamp (i.e., a synchronization message transmission timestamp) indicating a time at which the synchronization message was transmitted by the central timer and an I/O device ID from the received synchronization message. As described previously, the I/O device ID may be retrieved from the device ID field of the received synchronization message and the synchronization message transmission timestamp may be retrieved from the data-high field of the received synchronization message.

In block 506, the I/O device compares the I/O device ID of the received synchronization message with the designated device ID of the I/O device to determine whether the received synchronization message is determined for that I/O device. If not, the method 500 returns to block 502 until the next synchronization message has been received. Otherwise, the method 500 advances to block 508, in which the I/O device may save the transmit timestamp from the received time sync message (e.g., as another path delay reference calculation metric, along with the time at which the synchronization message was received by the I/O device). In block 510, the I/O device transmits a synchronization response message to the central timer from which the synchronization message has been received that includes the I/O device ID. In block 512, the I/O device stores the transmission time of the transmitted synchronization response message. In block 514, the I/O device determines whether a response acknowledgment message has been received from the central timer in response to the synchronization response message having been received at the central timer. If so, the method 500 advances to block 516, in which the I/O device stores the time at which the response acknowledgment was received.

In block 518, the I/O device identifies and stores timestamps stored in respective fields of the received response acknowledgment message. For example, in block 520, the I/O device identifies a timestamp from the received response acknowledgment message (e.g., from the data-low field) that corresponds to the time at which the synchronization response message was received by the central timer and stores the synchronization response message receipt timestamp. In block 522, the I/O device identifies a timestamp from the received response acknowledgment message (e.g., from the data-high field) that corresponds to the time at which the response acknowledgment message was transmitted by the central timer and stores the response acknowledgment message transmission timestamp. In block 524, the I/O device determines a transport delay as a function of the stored timestamps (see, e.g., the method 600 of FIG. 6) and stores the determined transport delay. In some embodiments, the timestamps may be stored in respective registers (e.g., memory mapped I/O registers) of the I/O device, such that software can read the stored timestamps and compute the transport delay.

Figure 6:
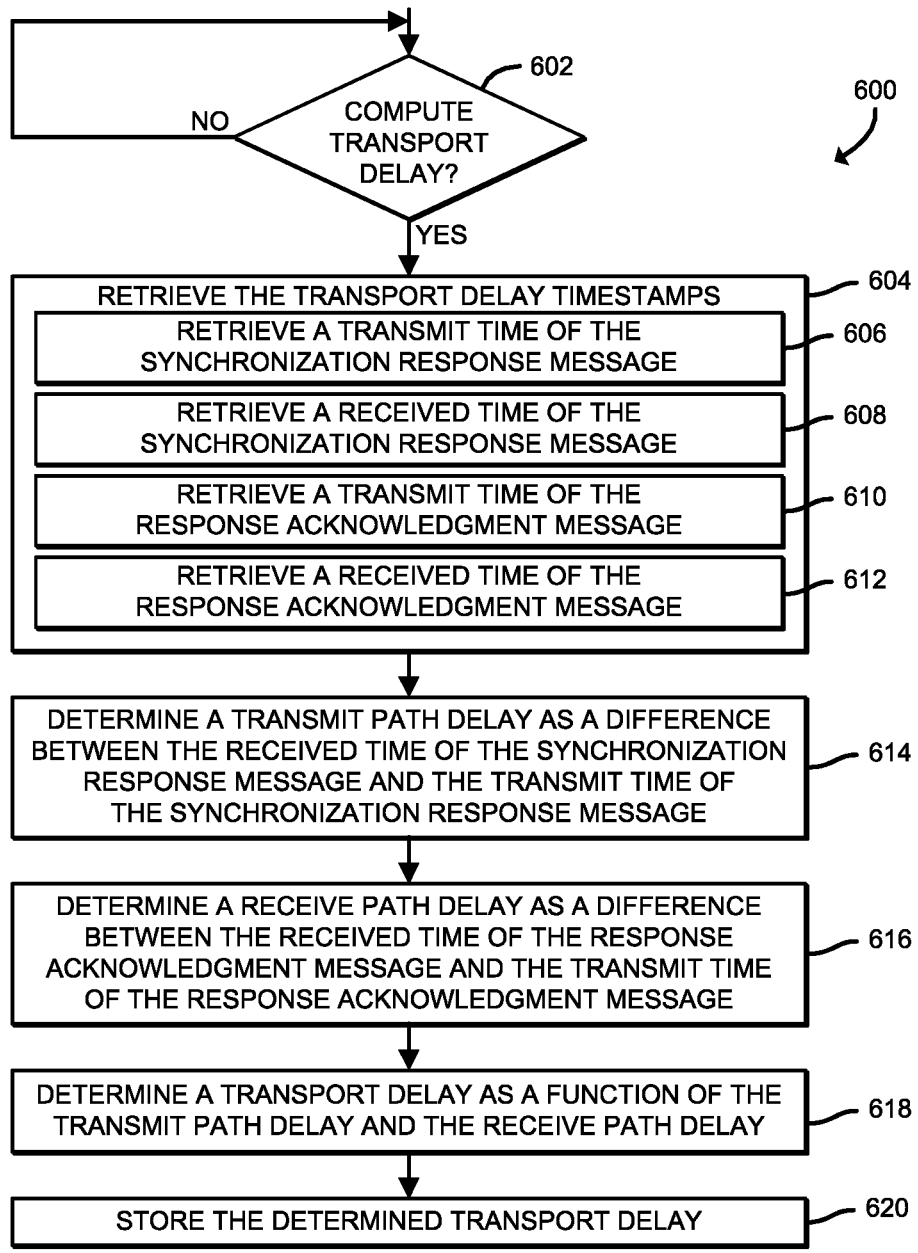
FIG. 6 is a simplified flow diagram of at least one embodiment of a method for calculating a transport delay usable to manage internal time synchronization that may be executed by the IoT device of FIG. 4.

Referring now to FIG. 6, a method 600 for calculating a transport delay is shown which may be executed by an IoT device (e.g., the IoT device 350). The method 600 begins in block 602, in which the IoT device 350, or more particularly an I/O device of the IoT device, determines whether to compute the transport delay. If so, the method 600 advances to block 604, in which the I/O device retrieves the transport delay timestamps (e.g., from the respective registers of the I/O device). In block 606, the I/O device retrieves a transmit time of the synchronization response message corresponding to the time at which the synchronization response message was transmitted from the I/O device, to the local, central timer. In block 608, the I/O device retrieves a received time of the synchronization response message corresponding to the time at which the synchronization response message was received by the central timer, from the I/O device. In block 610, the I/O device retrieves a transmit time of the response acknowledgment message corresponding to the time at which the response acknowledgment message was transmitted by the central timer, to the I/O device. In block 612, the I/O device retrieves a received time of the response acknowledgment message corresponding to the time at which the response acknowledgment message was received by the I/O device, from the central timer.

In block 614, the I/O device determines a transmit path delay as a difference between the retrieved synchronization response message received time and the retrieved synchronization response message transmission time. In block 616, the I/O device determines a receive path delay as a difference between the retrieved response acknowledgment message received time and the retrieved response acknowledgment message transmission time. In block 618, the I/O device determines the transport delay as an average of the determined transmit path delay and the receive path delay. In block 620, the I/O device stores the determined transport delay (e.g., in a register managed by the I/O device). Accordingly, the I/O device can use the transport delay to correct a timestamp associated with a message received from the central timer.

It should be appreciated that, in some embodiments, one or more additional timestamp correction operations may be required to be performed. For example, a network-based clock may be different from a processor clock. In such embodiments, the I/O device may be further configured to determine a correlation between the network-based clock time and the processor clock time such that an appropriate further adjustment of the timestamp can be performed. In another example, the I/O device may be additionally configured to determine an offset delay correction that is usable to further correct a timestamp received from the central timer.

Figure 7:
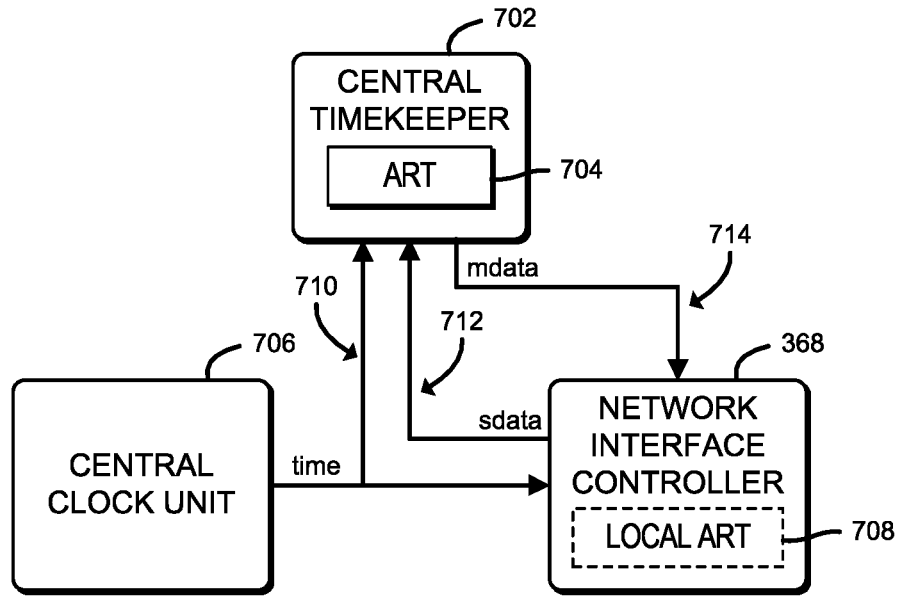
FIG. 7 is a simplified block diagram of at least one embodiment of an illustrative set of hardware of the IoT device of FIG. 4 for managing internal time synchronization.
Figure 8:
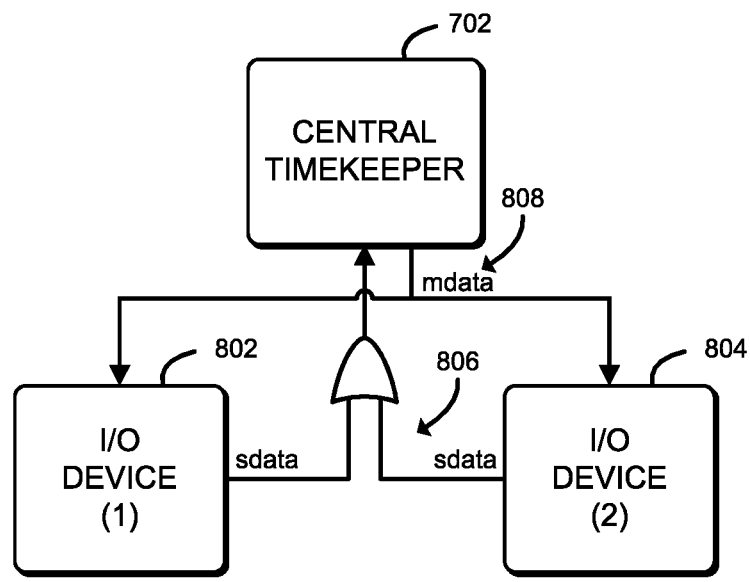
FIG. 8 is a simplified block diagram of at least one embodiment of another illustrative set of hardware of the IoT device of FIG. 4 for managing internal time synchronization.

Referring now to FIGS. 7 and 8, illustrative embodiments of I/O devices of the IoT device (e.g., the IoT device 350) are shown for managing internal time synchronization. In FIG. 7, a central timekeeper 702 is shown as being communicatively coupled to a central clock unit 706 (e.g., via time signal wire 710) and a NIC 368 (e.g., via a slave wire designated as sdata wire 712 and a "serial master", or main data wire, designated as mdata wire 714). Further, the central clock unit 706 is also communicatively coupled to the NIC 368. The illustrative central timekeeper 702 includes an ART 704 for transporting timestamps to local I/O devices (e.g., the NIC 368) in a serial transmission on the mdata wire 714. The local I/O device, illustratively shown as the NIC 368, may have a replica timer (e.g., the local ART 708) that runs on the same clock (e.g., the central clock unit 706) as the ART 704 of the central timekeeper 702. The local time of the I/O device is synchronized to a central timer based on packetized timestamps. However, as described herein, the I/O device, or more particularly the local ART 708 of the I/O device, can periodically correct the local time (see, e.g., the method 600 of FIG. 6).

In an illustrative example, when a serial packet has been received by an I/O device, the I/O device is configured to detect the sync pattern and convert the serial data stream to parallel timestamp value. Additionally, the local ART 708 is configured to continuously increment the timestamp, adjusting only when a new serial synchronization packet is received (e.g., as described in the method 500 of FIG. 5), thus maintaining a generally accurate synchronization. It should be appreciated that the central clock unit 706 is configured to periodically broadcast the timestamps (e.g., via the time signal wires 710) to keep the local ART 708 of the I/O device locked to the time of the central clock unit 706. As such, the tight synchronization can be achieved using the determined transport delay, thereby reducing jitter between the clocks (e.g., the central clock unit 706, the ART 704, and the local ART 708). For example, in industrial applications, it should be appreciated that not only does jitter needs to be reduced, but also the offset between the timers needs to be corrected as described herein.

Referring now to FIG. 8, the central timekeeper 702 is illustratively shown as being communicatively coupled to a first I/O device designated as I/O device 802 and a second I/O device designated as I/O device (2) 804. As illustratively shown, each I/O device 802, 804 is configured to transport messages to the central timekeeper 702 via a slave data wire designated as sdata signal wire 806. Additionally, the central timekeeper 702 is configured to transport messages to the I/O devices via a master data wire designated as mdata signal wire 808. It should be appreciated that, in complex, large SoC designs, the I/O devices (e.g., the I/O devices 802, 804) are often far from central timekeeper 702 and thus have large transmit/receive path delays. It should be further appreciated that these transmit/receive path delays need to be corrected for accurate timing of events. While the transmit/receive path delays vary according to process, voltage, temperature, and other conditions, they are almost static. Accordingly, a deterministic offset value can be added thereto to accurately get the current time.

Typically, the offset value is loaded into the local timer of the I/O device. However, since path delays vary due to process, voltage, temperature, and other conditions, and also vary from die to die, as well as can be different across different I/O devices placed at different distances, doing manual correction is typically not accurate, timely, or altogether convenient. Accordingly, the packet based messaging as described herein can automatically correct these offsets. As described previously, the offset, or transport path delay, can be calculated during boot time when an I/O device is brought up and the transport path delay value is loaded into a timing offset register of the I/O device. To facilitate these messages, the sdata signal wire 806 is added to present technologies between the I/O devices 805, 804 and the central timekeeper 702. Additionally, during boot, the central timekeeper can initiate the synchronization message protocol as described herein.

Figure 9:
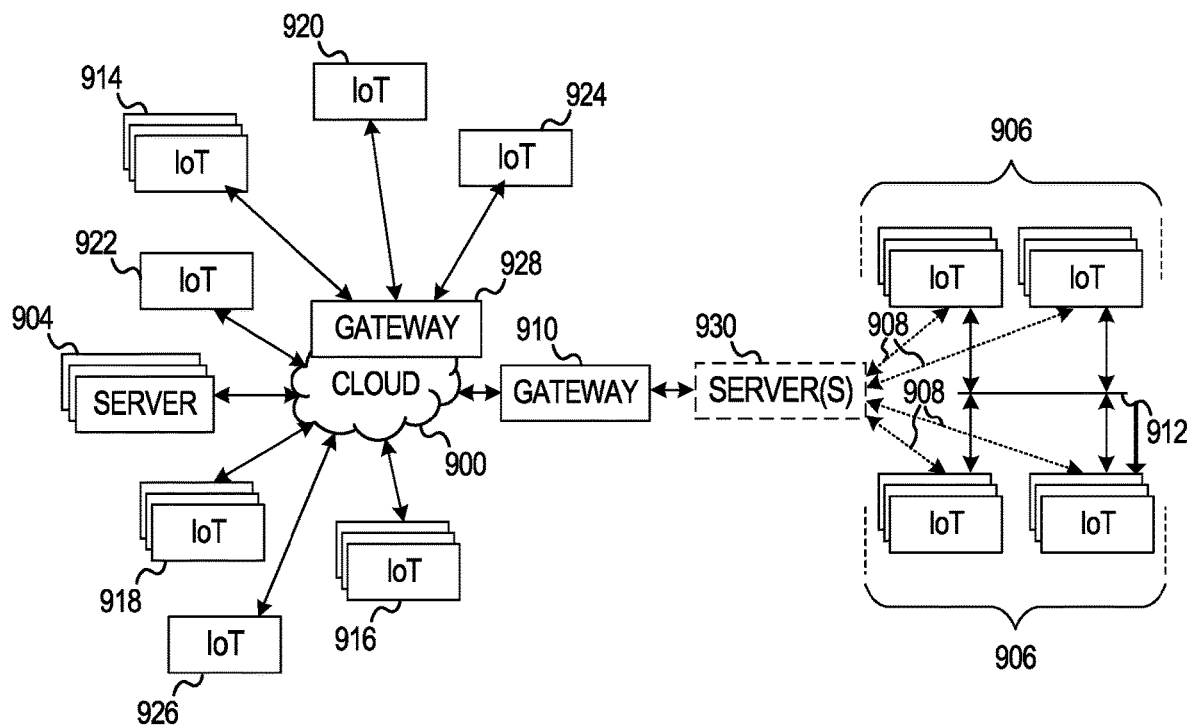
FIG. 9 is a simplified block diagram of at least one embodiment of a network illustrating communications among a number of IoT devices.

FIG. 9 illustrates a drawing of a cloud computing network, or cloud 900, in communication with a number of Internet of Things (IoT) devices (e.g., multiple IoT devices 350). The cloud 900 may represent the Internet, or may be a LAN, or a WAN, such as a proprietary network for a company. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 910 or 928 to communicate with remote locations such as the cloud 900; the IoT devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various IoT devices 914, 920, 924 being constrained or dynamic to an assignment and use of resources in the cloud 900.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog device or system (not shown, but depicted in FIGS. 2 and 3), or a combination therein. The groups of IoT devices may be deployed in various residential, commercial, and industrial settings (including private and public environments).

As can be seen from FIG. 9, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog device or system (e.g., as described above with reference to FIG. 2). It should be understood that the functional units or capabilities described in this specification may have been referred to or labeled as components or modules, in order to more particularly emphasize their implementation independence. Such components may be embodied by any number of software or hardware forms.

For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

It should be appreciated that while the functions described herein have been directed toward an IoT device embodiment (e.g., the IoT device 350), the functions may be performed by additional and/or alternative embodiments in other applications. For example, in other embodiments, the functions may be performed between a local, central timer and an I/O device in which the IoT device may instead be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced or smart NIC/HFI, a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system.

EXAMPLES

Illustrative examples of the technologies disclosed herein are provided below. An embodiment of the technologies may include any one or more, and any combination of, the examples described below.

Example 1 includes an internet-of-things (IoT) device for managing internal time synchronization, the IoT device comprising one or more I/O devices; a central timer; and transport delay correction management circuitry to determine a transport delay value as a function of a transmit path delay corresponding to a first message transmitted from an I/O device of the one or more I/O devices to the central timer of the IoT device and a receive path delay corresponding to a second message transmitted from the central timer to the I/O device; and update, in response to having received a broadcast message from the central timer and subsequent to having determined the transport delay value, a timestamp value of the received broadcast message as a function of the transport delay value.

Example 2 includes the subject matter of Example 1, and wherein to determine the transport delay value comprises to determine an average between the transmit path delay and a receive path delay.

Example 3 includes the subject matter of any of Examples 1 and 2, and wherein the first message is transmitted via a first wire and the second message is transmitted via a second wire, and wherein the first and second wires are different wires.

Example 4 includes the subject matter of any of Examples 1-3, and wherein the I/O device is to receive a synchronization message from the central timer; transmit, in response to having received the synchronization message, a synchronization response message to the central timer; store a first time that corresponds to a time at which the synchronization response message was transmitted by the I/O device; receive, subsequent to having transmitted the synchronization response message, a response acknowledgment message, wherein the response acknowledgment message includes a second time that corresponds to a time at which the synchronization response message was received by the central timer and a third time that corresponds to a time at which the response acknowledgment message was transmitted by the central timer; store the second time and the third time; and store a fourth time that corresponds to a time at which the response acknowledgment message was received by the I/O device.

Example 5 includes the subject matter of any of Examples 1-4, and wherein to determine the transport delay value comprises to determine a difference between the second time and the first time.

Example 6 includes the subject matter of any of Examples 1-5, and wherein to determine the receive delay value comprises to determine a difference between the fourth time and the third time.

Example 7 includes the subject matter of any of Examples 1-6, and wherein to store the first, second, third, and fourth times comprises to store each of the first, second, third, and fourth times in a different register of the IoT device.

Example 8 includes the subject matter of any of Examples 1-7, and wherein to correct the timestamp value comprises to subtract the transport delay value from the timestamp value.

Example 9 includes one or more machine-readable storage media comprising a plurality of instructions stored thereon that, in response to being executed, cause an internet-of-things (IoT) device to determine a transport delay value as a function of a transmit path delay corresponding to a first message transmitted from an I/O device of the IoT device to a central timer of the IoT device and a receive path delay corresponding to a second message transmitted from the central timer to the I/O device; and update, in response to having received a broadcast message from the central timer subsequent to having determined the transport delay value, a timestamp value of the received broadcast message as a function of the transport delay value.

Example 10 includes the subject matter of Example 9, and wherein to determine the transport delay value comprises to determine an average between the transmit path delay and a receive path delay.

Example 11 includes the subject matter of any of Examples 9 and 10, and wherein the first message is transmitted via a first wire and the second message is transmitted via a second wire, and wherein the first and second wires are different wires.

Example 12 includes the subject matter of any of Examples 9-11, and wherein the plurality of instructions further cause the I/O device to receive a synchronization message from the central timer; transmit, in response to having received the synchronization message, a synchronization response message to the central timer; store a first time that corresponds to a time at which the synchronization response message was transmitted by the I/O device; receive, subsequent to having transmitted the synchronization response message, a response acknowledgment message, wherein the response acknowledgment message includes a second time that corresponds to a time at which the synchronization response message was received by the central timer and a third time that corresponds to a time at which the response acknowledgment message was transmitted by the central timer; store the second time and the third time; and store a fourth time that corresponds to a time at which the response acknowledgment message was received by the I/O device.

Example 13 includes the subject matter of any of Examples 9-12, and wherein to determine the transport delay value comprises to determine a difference between the second time and the first time.

Example 14 includes the subject matter of any of Examples 9-13, and wherein to determine the receive delay value comprises to determine a difference between the fourth time and the third time.

Example 15 includes the subject matter of any of Examples 9-14, and wherein to store the first, second, third, and fourth times comprises to store each of the first, second, third, and fourth times in a different register of the IoT device.

Example 16 includes the subject matter of any of Examples 9-15, and wherein to correct the timestamp value comprises to subtract the transport delay value from the timestamp value.

Example 17 includes a method for managing internal time synchronization, the method comprising determining, by an internet-of-things (IoT), a transport delay value as a function of a transmit path delay corresponding to a first message transmitted from an I/O device of the IoT device to a central timer of the IoT device and a receive path delay corresponding to a second message transmitted from the central timer to the I/O device; and updating, by the IoT device and in response to having received a broadcast message from the central timer and subsequent to having determined the transport delay value, a timestamp value of the received broadcast message as a function of the transport delay value.

Example 18 includes the subject matter of Example 17, and wherein determining the transport delay value comprises determining an average between the transmit path delay and a receive path delay.

Example 19 includes the subject matter of any of Examples 17 and 18, and transmitting the first message via a first wire and transmitting the second message is via a second wire, wherein the first and second wires are different wires.

Example 20 includes the subject matter of any of Examples 17-19, and further comprising receiving, by the I/O device, a synchronization message from the central timer; transmitting, by the I/O device and in response to having received the synchronization message, a synchronization response message to the central timer; storing, by the I/O device, a first time that corresponds to a time at which the synchronization response message was transmitted by the I/O device; receiving, by the I/O device and subsequent to having transmitted the synchronization response message, a response acknowledgment message, wherein the response acknowledgment message includes a second time that corresponds to a time at which the synchronization response message was received by the central timer and a third time that corresponds to a time at which the response acknowledgment message was transmitted by the central timer; storing, by the I/O device, the second time and the third time; and storing, by the I/O device, a fourth time that corresponds to a time at which the response acknowledgment message was received by the I/O device.

Example 21 includes the subject matter of any of Examples 17-20, and wherein determining the transport delay value comprises determining a difference between the second time and the first time.

Example 22 includes the subject matter of any of Examples 17-21, and wherein determining the receive delay value comprises determining a difference between the fourth time and the third time.

Example 23 includes the subject matter of any of Examples 17-22, and wherein storing the first, second, third, and fourth times comprises storing each of the first, second, third, and fourth times in a different register of the IoT device.

Example 24 includes the subject matter of any of Examples 17-23, and wherein correcting the timestamp value comprises subtracting the transport delay value from the timestamp value.

The invention claimed is:

1. An apparatus comprising:
memory;
instructions; and
circuitry to execute the instructions to:
trigger a first message from a first device to a second device based on a first identifier of a synchronization message matching a second identifier of the first device, the first message including the first identifier;
access a transport delay value associated with the first message and a second message from the second device; and
update a timestamp value based on the transport delay value.

2. The apparatus of claim 1, wherein the circuitry is to access a first time at which the first message was transmitted by the first device, a second time at which the first message was received by the second device, a third time at which at which the second message was transmitted by the second device, and a fourth time at which the second message was received by the first device.

3. The apparatus of claim 2, wherein the circuitry is to:
determine a transmit path delay corresponding to a first difference between the first time and the second time;
determine a receive path delay corresponding to a second difference between the third time and the fourth time; and
determine the transport delay value based on the transmit path delay and the receive path delay.

4. The apparatus of claim 3, wherein the transport delay value corresponds to an average of the transmit path delay and the receive path delay.

5. The apparatus of claim 1, wherein the first device is an I/O device of an internet-of-things (IoT) device and the second device is a central timer of the IoT device.

6. The apparatus of claim 1, where the circuitry is to trigger the second device to transmit the synchronization message during a boot time of the second device.

7. The apparatus of claim 1, wherein the timestamp value is associated with a broadcast message from the second device.

8. A non-transitory computer readable medium comprising instructions that, when executed, cause circuitry to at least:
trigger a first message from a first device to a second device based on a first identifier of a synchronization message matching a second identifier of the first device, the first message including the first identifier;
access a transport delay value associated with the first message and a second message from the second device; and
update a timestamp value based on the transport delay value.

9. The non-transitory computer readable medium of claim 8, wherein the instructions cause the circuitry to access a first time at which the first message was transmitted by the first device, a second time at which the first message was received by the second device, a third time at which at which the second message was transmitted by the second device, and a fourth time at which the second message was received by the first device.

10. The non-transitory computer readable medium of claim 9, wherein the instructions cause the circuitry to:
determine a transmit path delay corresponding to a first difference between the first time and the second time;
determine a receive path delay corresponding to a second difference between the third time and the fourth time; and
determine the transport delay value based on the transmit path delay and the receive path delay.

11. The non-transitory computer readable medium of claim 10, wherein the transport delay value corresponds to an average of the transmit path delay and the receive path delay.

12. The non-transitory computer readable medium of claim 8, wherein the first device is an I/O device of an internet-of-things (IoT) device and the second device is a central timer of the IoT device.

13. The non-transitory computer readable medium of claim 8, where the instructions cause the circuitry to trigger the second device to transmit the synchronization message during a boot time of the second device.

14. The non-transitory computer readable medium of claim 8, wherein the timestamp value is associated with a broadcast message from the second device.

15. A method comprising:
triggering a first message from a first device to a second device based on a first identifier of a synchronization message matching a second identifier of the first device, the first message including the first identifier;
accessing a transport delay value associated with the first message and a second message from the second device; and
updating a timestamp value based on the transport delay value.

16. The method of claim 15, further including accessing a first time at which the first message was transmitted by the first device, a second time at which the first message was received by the second device, a third time at which at which the second message was transmitted by the second device, and a fourth time at which the second message was received by the first device.

17. The method of claim 16, further including:
determining a transmit path delay corresponding to a first difference between the first time and the second time;
determining a receive path delay corresponding to a second difference between the third time and the fourth time; and
determining the transport delay value based on the transmit path delay and the receive path delay.

18. The method of claim 17, wherein the transport delay value corresponds to an average of the transmit path delay and the receive path delay.

19. The method of claim 15, wherein the first device is an I/O device of an internet-of-things (IoT) device and the second device is a central timer of the IoT device.

20. The method of claim 15, further including triggering the second device to transmit the synchronization message during a boot time of the second device.

* * * * *